April 15, 1969  C. W. TRIGGS  3,438,698
PHOTOGRAPHIC APPARATUS
Filed Feb. 28, 1967  Sheet 1 of 2

INVENTOR.
Charles W. Triggs
BY
Brown and Mikulka
ATTORNEYS

United States Patent Office 3,438,698
Patented Apr. 15, 1969

3,438,698
PHOTOGRAPHIC APPARATUS
Charles W. Triggs, Lynn, Mass., assignor to Polaroid Corporation, Cambridge, Mass., a corporation of Delaware
Filed Feb. 28, 1967, Ser. No. 619,411
Int. Cl. G02b 7/02; G09f 11/30, 13/10
U.S. Cl. 350—250    8 Claims

ABSTRACT OF THE DISCLOSURE

The subject invention relates to an inexpensive but highly-efficient hand-held, folding, reflex, viewing-device or "slide-viewer" for inspecting photographic transparencies of a miniature category. The invention is particularly pointed toward constructions thereof which provide an augmented illumination of the transparency and which include: (1) A peaked or triangular structure involving front and rear panel members joined together at the top or peak and depending at acute angles from the apex toward a base member having an inner reflecting surface; (2) a removable diffusing screen which is snapped or hooked into functional position across a light-admitting aperture formed in the front panel and which, when removed, permits entrance to the interior for cleaning purposes; (3) a top-, bottom-, and center-hinged rear panel member mounting an eye-piece; (4) a two-position detent or locking means for holding the device at either a folded transport position or an erect functional position; and (5) an integral, hinged, non-separable relation of front, side, rear and base panel members for enhanced durability and for providing that no manual interconnection of parts is necessary prior to operation.

---

The viewing-device of the invention is of particular efficiency in that its peaked construction permits the ready admittance to a darkened interior of a maximum of light rays from an external source such as daylight or an incandescent lamp than does a conventional slide-viewer. This largely derives from the inclined and somewhat upwardly-facing entrance port for the rays. An entrance aperture thus positioned more completely admits rays from a source, e.g., from the sky or a lamp which, relatively, is at an overhead location. The foregoing advantage is not present where an entrance aperture for light from an external source is vertically disposed, as in the usual slide-viewer. In the latter instance, it is practically always necessary to tilt the head in a somewhat awkward and uncomfortable manner to place the viewing-device sufficiently in line with the light source to obtain maximum illumination of the mounted transparency.

The inclined disposition of the entrance port in the viewer of the present invention is, in general, made possible by the aforesaid peaked or triangular structure and the use of an internal reflecting surface or mirror provided on a generally horizontal base panel member, the latter being obliquely angularly-disposed with respect to the depending front panel member in which the entrance port for light rays from an external source is formed, and relative to the depending rear panel member in which an eye-piece in the form of a positive lens is mounted. The front and rear panel members are permanently joined together at their upper extremities to form the "peak" or apex, and at their lower extremities to each end of the base.

In accordance with the foregoing considerations, objects of the invention are to provide an inexpensive, highly-efficient, folding, pocket-type viewing-device for photographic transparencies; to provide a hand-held viewing-device of the character described which is of a reflex type having a large light-gathering capacity thereby providing an augmented illumination of the transparency; to provide a slide-viewer, as above defined, which is of a triangular structure having a pair of obliquely-inclined members, respectively, including a light-entering and a light-emitting aperture; to provide a viewing-device of the type indicated which includes a releasably-mounted diffusing screen at the light-entering aperture and a magnifying eye-piece at the light-emitting aperture; to provide a triangular viewing-device, as stated, wherein each member forming a side of the triangle is pivotally connected at both ends to another member, thus producing a unitary structure; to provide a slide-viewer of the category set forth which includes detent or locking means for holding it, alternatively, in a flattened transport condition or in an erect functional position; and to provide a device of the character described which is composed of an opaque, resilient plastic material.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
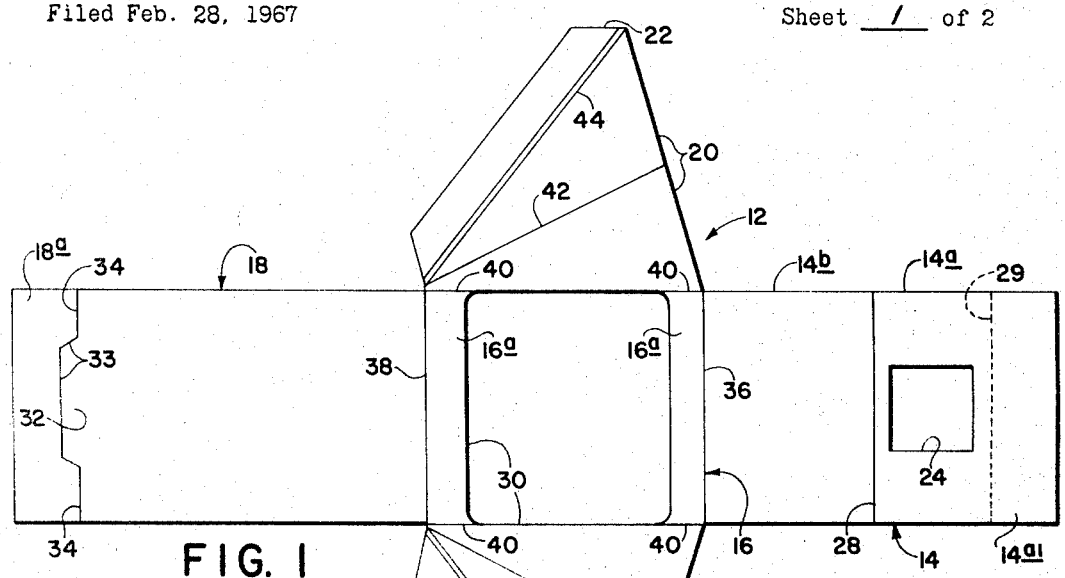
FIGURE 1 is a diagrammatic plan view of a blank sheet of material from which the viewing-device of the present invention is, in large measure, fabricated.
Figure 2:
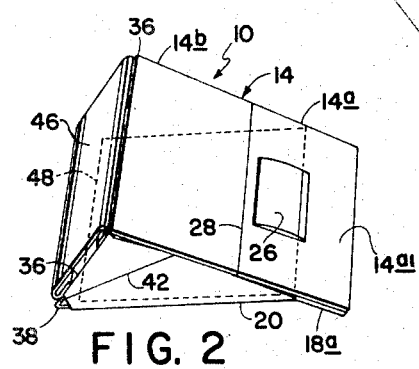
FIG. 2 is a diagrammatic, perspective, overhead view of the viewing-device ready for use.

Referring now to the drawings, the viewing-device 10 of the present invention is shown at various structural and functional stages or conditions. In FIGURE 1, a blank 12 from which the body or housing of the viewing-device is fabricated is illustrated. The blank 12 is preferably composed of a resilient opaque sheet material, e.g., a black plastic sheet material such, for example, as a polypropylene or a polyallomer. An example of a polypropylene suitable for the purpose is that termed "Escon," sold by the Enjay Chemical Co., 60 West 49th Street, New York, N.Y., U.S.A., or a polypropylene sold by Avison Corporation, Marcus Hook, Pa., U.S.A. A polyallomer adapted to fabrication of the subject device is sold by Eastman Chemical Products, Inc., Kingsport, Tenn., U.S.A.

The blank 12, formed in one piece, principally comprises a plurality of sections or panel members, namely, a rear panel member 14, a front panel member 16 composed essentially of the two transverse bar or frame components 16a, a bottom or base member 18, and a pair of side members or bellows 20, each having a hinged flap 22 at its extremity. The rear panel 14 includes an aperture 24 formed therein in which a positive lens 26 is to be mounted. A crease or hinge 28 extends transversely across the panel 14 at its approximate midpoint, permitting the portions or sub-sections 14a and 14b to be folded one upon the other. The portion 14a includes an appendage 14a¹, set off by the broken line 29, which serves several functions, to be described below. The front panel 16 has a large rectangular aperture 30 formed therein. The bottom panel or base 18 includes a cut-out section 32 formed by the cut-line 33 so as to be located transversely intermediate of a pair of hinge- or fold-lines 34. The appendage portion or section 18a of the base is thus permitted pivotal movement about the fold-lines 34 while the section 32 is capable of being independently moved and flexed and serves as a spring element for a purpose to be described below. The rear and front panels 14 and 16 respectively, are hingedly connected to one another at fold 36; the front and base panels are hinged together at 38, the side members 20 are hinged to the front member at 40 and include the center-folds 42. The flaps 22 are hingedly attached at 44.

In FIGS. 2 through 9, the viewing-device is shown, respectively, in assembled form and at various stages of folded, partially-erect, or completely-erect-operational condition. Completing the component parts of the viewing-device, are a translucent diffusing-screen 46, having over-turned S-shaped extremities 46a, and a mirror 48. The diffusing screen may suitably be composed of a neutral, translucent, flexible polypropylene, e.g., one sold by the aforementioned Avison Corporation. The mirror 48, so mounted on the base member 18 as to face inwardly and obliquely relative to the entrance aperture 30 and eye-piece 26, when the viewing-device is completely assembled, is preferably composed of a first-surface metal-coated glass. Alternatively, it may be in the form of a metallic deposition on a plastic or metal substrate, a polished metal sheet, or of some other suitable type.

Figure 8:
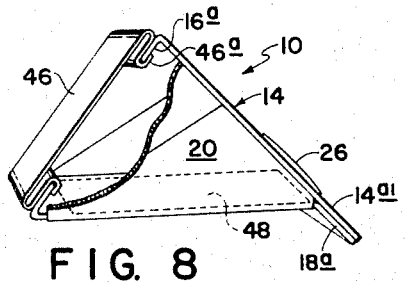
FIG. 8 is a diagrammatic, perspective side view of the viewing-device, with a portion of one flexible side member or bellows broken away to illustrate means for releasably-mounting a diffusing screen.
Figure 9:
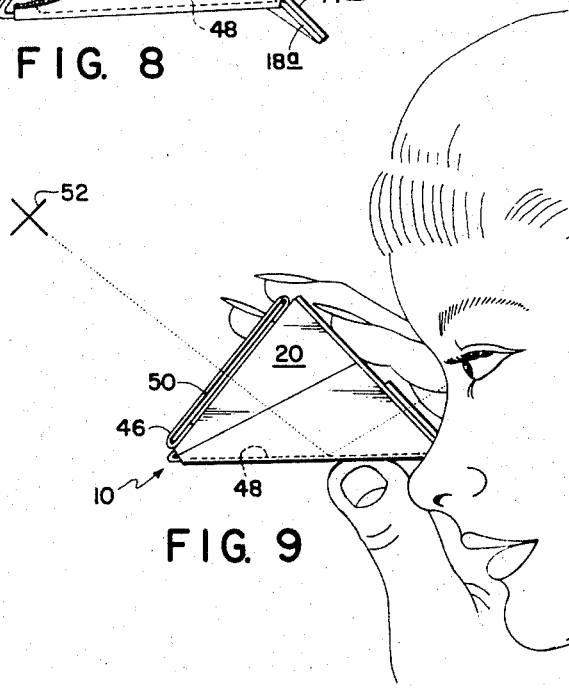
FIG. 9 is a diagrammatic side view illustrating the device of the present invention in operation.

In transforming the blank 12 of FIGURE 1 to the assembled viewing device 10 shown in FIGS. 2 through 9, the blank is folded downwardly at fold-lines 36 and 38. The underlying surface of the base section 18a is bonded, preferably ultrasonically, to the facing underlying surface of the rear panel appendage 14a¹. Alternatively, bonding may be accomplished by using a suitable adhesive. The side members 20 are then bent downwardly at the fold lines 40 and the flaps 22 are bonded to the under surface of the base 18, using a similar bonding technique. The lens 26 is inserted in the aperture 24 and held mounted therein, as by coating the edges thereof with a suitable adhesive or by overlapping its margins and adjacent portions of the section 14a with a pressure-sensitive tape. The diffusing screen 46 is installed by flexing it slightly and slipping its shaped extremities over the facing edges of the cross-members 16a, as shown in FIG. 8.

Figure 3:
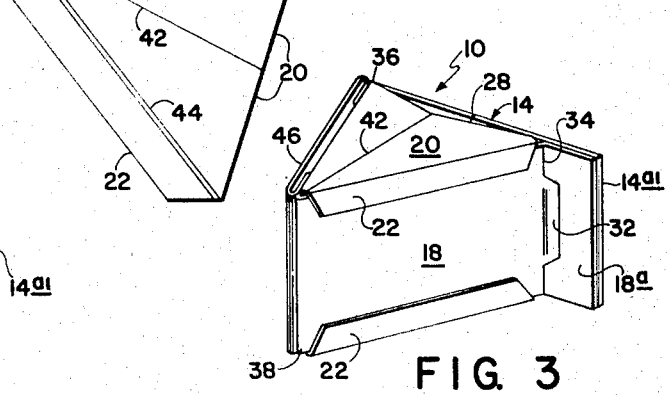
FIG. 3 is a diagrammatic, perspective, underneath view illustrating one position of the locking means.
Figure 4:
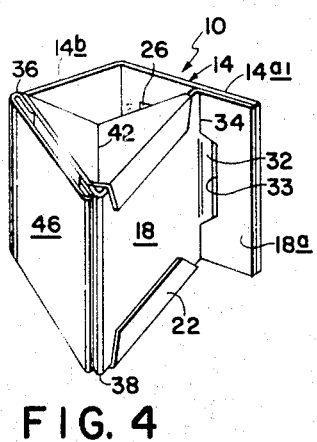
FIG. 4 is a diagrammatic, perspective view showing a second position of the locking means.
Figure 5:
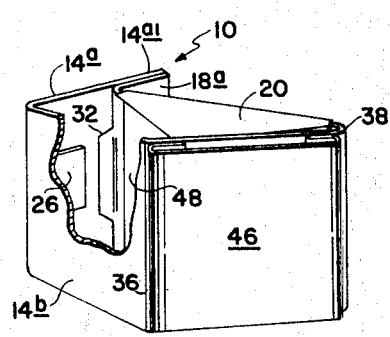
FIG. 5 is a diagrammatic, perspective view illustrating a third position of the locking means.
Figure 6:
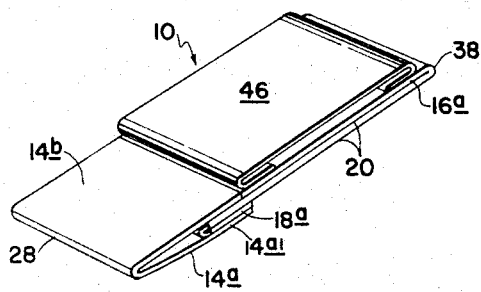
FIG. 6 is a diagrammatic, perspective view of the viewing-device in a flattened or folded condition.
Figure 7:
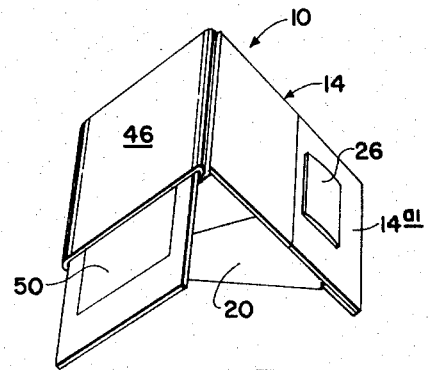
FIG. 7 is a diagrammatic, perspective view of the viewing-device showing a transparency partially mounted therein.

The cut-out portion 32 of the base panel section 18a performs in the manner of a flat over-center spring element and will be so termed. It serves to hold or lock the viewing device erect as shown in FIGS. 2, 3, 7, 8 and 9 or in a folded condition as illustrated in FIG. 6. Operation of the spring element 32 is shown at three stages in FIGS. 3, 4 and 5, respectively. In FIG. 3 it bears against the facing unbonded surface of the rear panel member 14 to provide a planar condition and full extension of the rear panel 14. With spring element 32 thus positioned, the viewing-device 10 is releasably locked at operational position. In FIG. 4, the viewing-device is to be understood as undergoing transition to a folded condition, as by holding the front and base panel members between the thumb and first fingers of one hand adjacent to the fold-line 38, and pivoting the appendage formed by the bonded portions 14a¹ and 18a in a clockwise direction with the other hand. Pivotal movement of the members occurs at the fold-lines 34, 28, 36, and 38.

The spring element 32, still bearing against the under surface of the rear panel member 14, is thereby caused to move to the left as shown in FIG. 4 toward a center fully-extended position at which the base 14 and spring element 32 lie in a single plane. In FIG. 5, with continued clockwise movement of the appendage 14a¹–18a, the spring element 32 has passed over center and is now exerting pressure against the inner surface of section 14a. A continued clockwise movement of the appendage 14a¹–18a produces the folded or flattened condition of the viewing-device shown in FIG. 6, it being releasably held or locked at this position by the spring element 32.

To once again provide an erect operational status of the device, the appendage 14a¹–18a is manually urged in a counterclockwise direction, the spring 32 thereby passing reversely through the stage shown in FIG. 4 and assuming the position of FIG. 3. The inherent resilience of the plastic material of which the device, and more particularly the over-center spring 32, is composed is adapted to enable its holding or locking operation, as described. The structure of the appendage 14a¹–18a serves several functions. In the first place, bonded surfaces of adequate area of the sections 14a¹ and 18a, exclusive of those underlying the spring element 32, are provided. Secondly, the cut-out line 33 forms the spring 32 and produces the hinges at 34. Thirdly, the appendage serves as a light shield to prevent the passage of extraneous light rays from beneath the device and striking the viewing eye.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A hand-held viewing-device of improved light-gathering capability for inspecting miniature photographic transparencies, comprising three opaque planar panel members joined together at their extremities to form a triangle including a rear panel member, a front panel member and a base panel member, opaque side-panel means so attached to said front and base panel members as to cover both sides of said device in the spaces between said panel members, an eye-piece in the form of a positive lens mounted in said rear panel member, means forming a rectangular aperture in said front panel member for entrance of light from an external source, a light-diffusing screen positioned across said aperture in forwardly spaced relation thereto thereby providing mounting means for the slidable positioning of a mounted transparency between said front panel member and said light-diffusing screen, and means providing a mirror surface on the inner surface of said base panel member so as to obliquely face both said entrance aperture and said eye-piece, a magnified image of said transparency thereby being visible at a surface of said mirror.

2. A viewing-device, as defined in claim 1, wherein the extremities of said diffusing screen are overturned for releasably engaging edge portions of said front panel member adjacent to said aperture thereof to permit the removal and re-installation of said light-diffusing screen.

3. A viewing-device, as defined in claim 1, wherein bonded portions of said rear and front panels project downwardly as an appendage beyond the plane of said base panel member to form a light shield with respect to extraneous light which might otherwise be incident upon the viewing eye.

4. A hand-held, foldable, reflex viewing-device of improved light-gathering capability for inspecting miniature photographic transparencies, comprising three opaque planar panel members hingedly joined together at their extremities to form a triangle including a rear panel member, a front panel member and a base panel member, flexible opaque bellows means so hingedly attached to said front and base panel members as to cover both sides of said device in the spaces between said panel members, an eye-piece in the form of a positive lens mounted in said rear panel member, means forming a rectangular aperture in said front panel member for entrance of light from an external source, a light-diffusing screen positioned across said aperture in forwardly spaced relation thereto thereby providing mounting means for the slidable positioning of a mounted transparency between said front panel member and said light-diffusing screen, and means providing a mirror surface on the inner surface of said base panel member so as to obliquely face both said entrance aperture and said eye-piece, a magnified image of said transparency thereby being visible at a surface of said mirror.

5. A viewing-device, as defined in claim 4, wherein said panel members and bellows are composed of a flexible plastic material.

6. A viewing-device, as defined in claim 4, wherein said panel members and bellows are pivotable at a plurality of fold-lines to enable a flat transport condition of said device and an erect operational condition thereof.

7. A viewing-device as defined in claim 4, wherein bonded portions of said rear and front panels project downwardly as an appendage beyond the plane of said base panel member, wherein said base panel member includes a fold-line at its junction with said rear panel member, and wherein said rear panel member includes a fold-line extending transversely thereacross at its approximate midpoint, said eye-piece being located between said appendage and said last-named fold-line.

8. A hand-held, foldable, reflex, viewing-device of improved light-gathering capability for inspecting miniature photographic transparencies, comprising three opaque planar panel members formed of a resilient plastic material and hingedly joined together at their extremities to form a triangle including a two-section rear panel member, the sections of which are pivotally connected, a front panel member and a base panel member, flexible opaque bellows means so hingedly attached to said front and base panel members as to cover both sides of said device in the spaces between said panel members, an eye-piece in the form of a positive lens mounted in a lower one of the two sections of said rear panel member, an appendage composed of a pivotal extension of said base panel member and an extension of said lower section of said rear panel member in partially bonded relation, a flat transversely-extending spring element formed of a cut-out portion of said extension of said rear panel member at an unbonded portion thereof, means forming a rectangular aperture in said front panel for entrance of light from an external source, a light-diffusing screen positioned across said aperture in forwardly spaced relation thereto thereby providing mounting means for the slidable positioning of a mounted transparency between said front panel member and said light-diffusing screen, and means providing a mirror surface on the inner surface of said base panel member so as to obliquely face both said entrance aperture and said eye-piece, an image of said transparency thereby being visible at a surface of said mirror and magnified by said lens, said flat spring element being adapted to bear against an unbonded inner surface of said rear panel member and operate in an over-center manner to hold said viewing device, optionally, in a folded and an erect operational condition.

References Cited

UNITED STATES PATENTS

| | | | |
|---|---|---|---|
| 607,171 | 7/1898 | Hill | 350—144 |
| 2,621,993 | 12/1952 | Miles | 350—239 X |
| 2,876,674 | 3/1959 | Ohlhaver | 40—64 X |
| 3,386,194 | 6/1968 | Kaufman | 40—63 |

JEROME SCHNALL, *Primary Examiner.*

R. CARTER, *Assistant Examiner.*

U.S. Cl. X.R.

40—63, 106.1